United States Patent [19]

Valkanas

[11] Patent Number: 5,803,670

[45] Date of Patent: Sep. 8, 1998

[54] METHOD OF CULTIVATION OF COAL AND LIGNITE INFIELDS FORMED BY UNCOVERING (OPEN CAST MINING)

[75] Inventor: George N. Valkanas, Maroussi, Greece

[73] Assignee: Compostella Compania Maritime Ltd., Nicosia, Cyprus

[21] Appl. No.: 916,750

[22] Filed: Aug. 19, 1997

Related U.S. Application Data

[63] Continuation of Ser. No. 379,668, filed as PCT/GR94/00012, Jun. 3, 1994 published as WO94/28705, Dec. 22, 1994.

[30] Foreign Application Priority Data

Jun. 4, 1993 [GR] Greece .............................. 930100228

[51] Int. Cl.$^6$ ........................................................ C05G 3/04
[52] U.S. Cl. ............................ 405/258; 405/128; 47/17; 47/DIG. 10
[58] Field of Search .................................... 405/258, 128, 405/129, 263; 47/DIG. 10, 17

[56] References Cited

U.S. PATENT DOCUMENTS

| | | | |
|---|---|---|---|
| 3,633,310 | 1/1972 | Sandiford | 47/DIG. 10 |
| 3,798,838 | 3/1974 | Hashimoto et al. | 47/DIG. 10 |
| 4,051,630 | 10/1977 | Bishop | 47/DIG. 10 |
| 4,063,386 | 12/1977 | Tramier | 47/DIG. 10 |
| 4,095,369 | 6/1978 | Posnansky et al. | 47/17 RM |
| 4,299,613 | 11/1981 | Cardarelli | 47/DIG. 10 |
| 4,979,331 | 12/1990 | Tanaka et al. | 47/17 RM |
| 5,137,563 | 8/1992 | Valkanas | 71/64.07 |
| 5,356,452 | 10/1994 | Fahey | 405/129 X |
| 5,399,048 | 3/1995 | Walker | 405/129 |

FOREIGN PATENT DOCUMENTS

| | | |
|---|---|---|
| 0140795 | 5/1985 | European Pat. Off. . |
| 3713055 | 12/1988 | Germany . |
| 4105595 | 9/1992 | Germany . |
| 56028689 | 3/1987 | Japan . |
| 600747 | 6/1978 | Switzerland . |

OTHER PUBLICATIONS

Derwent Publications Ltd., London, GB; Database WPI Section Ch, Week 8119, Class L02, An 81–33443D & JP, A, 56 028 689 (Mitsubishi Heavy Ind KK) 20 Mar. 1981.

Theodoropoulos, A.G. et al., "Recycling of Hydrophobic Polymeric Materials in the Form of Hydrogels and Swelling Promotion Thereof" Macromolecular Reports, A31(Supls. 1&2), 9–17 (1994).

Macromolecular Reports, "Recycling of Hydrophobic Polymeric Materials in the Form of Hydrogels and Swelling Promotion There Of" pp. 9–17, Valkanas et al., May 15, 1997.

Theodoropoulos, A.G. et al., "Sulfone–Type Crosslinks in Sulgonation of Macronet Polystyrene Backbone" Polymer, vol. 34, No. 18, 1993, pp. 3905–3910.

Kakoulides, E.P. et al., "Synthetic Macronet Hydrophilic Polymers as Soil Conditioners.I. Kinetic Characterization of Macronet Sulfonated Polystyrene Resins" Commun. Soil Sci. Plant Anal., 24 (13&14), 1709–1720 (1993).

Theodoropoulos, A.G. et al., "Synthetic Macronet Hydrophilic Polymers as Soil Conditioners. II. The Effect of the Final Ion Form of Crosslinked Sulfonated Polystyrene on Seedling Growth", Commun. Soil Sci. Plant Anal., 24(13&14), 1721–1731 (1993).

*Primary Examiner*—Tamara L. Graysay
*Assistant Examiner*—Frederick Lagman
*Attorney, Agent, or Firm*—Ladas & Parry

[57] ABSTRACT

A method is described to utilize used open-cast lignite mines by installing greenhouses with technological products attaining water economy of 7–8 times, unlimited nutritional capacity by enclosing pesticides and nutrients in a system of resins so as to release elements gradually, and with addition of calcium carbonate so as to limit the creation of sulfuric acid by the action of ground bacteria without pollution of the soil. This limits the need to move the greenhouses, and constitutes an original solution of agricultural utilization of these otherwise toxic and infertile soils.

14 Claims, 1 Drawing Sheet

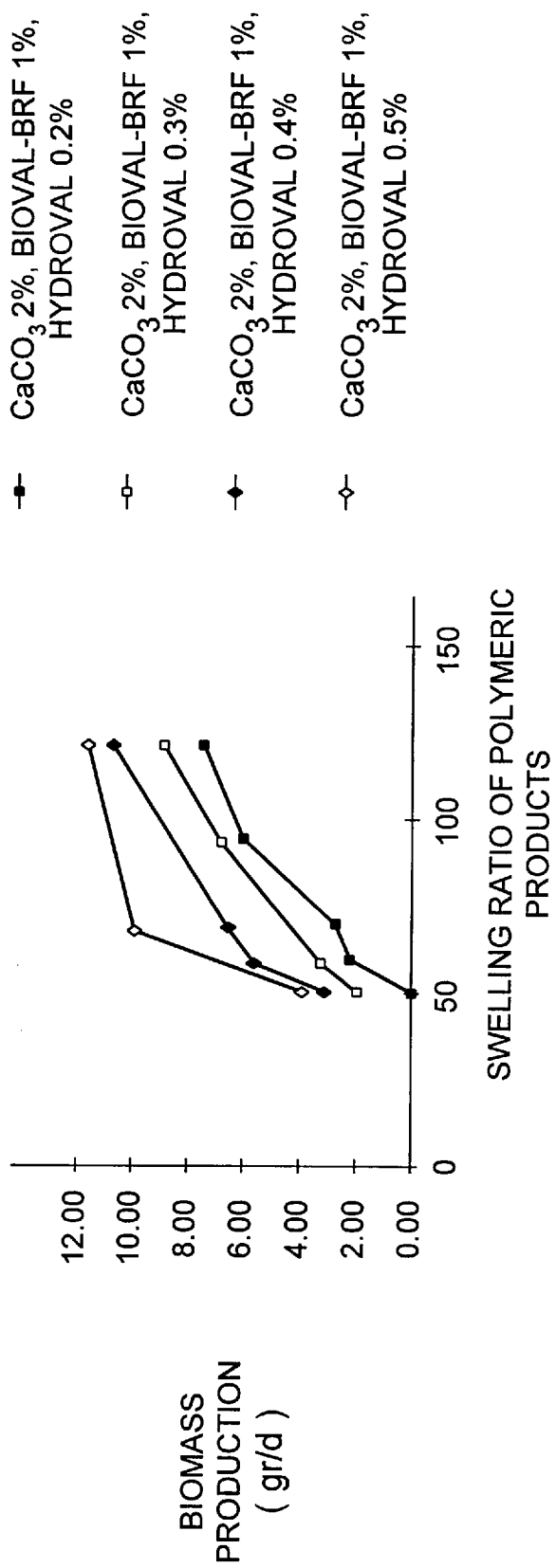

METHOD OF CULTIVATION OF COAL AND LIGNITE INFIELDS FORMED BY UNCOVERING (OPEN CAST MINING)

This application is a continuation of application Ser. No. 08/379,668 filed on Feb. 6, 1995 now abandoned and International Application PCT/GR94/00012 filed on Jun. 3, 1994 published as WO94/28705, Dec. 22, 1994, and which designated the U.S.

FIELD OF INVENTION

The invention describes a method of agricultural utilization of lignite and coal fields resulting from the technique of uncovering. This method specifically describes an original approach of introducing technological products in those fields, which promote water economy, water availability and nutritional efficiency in the soils of lignite and coal fields after the extraction of carbonaceous matter, and of introducing agricultural utilization with massive operation of greenhouses.

BACKGROUND OF INVENTION

The lignite and coal fields which result from uncovering, after the extraction of richer deposits and with rejected earth stacked in heaps, form surfaces containing carbonous matter which in general are not equilibrated soils and do not show fertility. These soil surfaces from unrecovering and from rejected agregates in heaps, contain sulfur, usually in high amounts 0.5–3%. Sulfur contained in such soil is converted very rapidly to sulfuric acid through the oxidative action of thiooxidative bacteria which oxidize sulfur.

The soils of lignite and coal fields which are formed with the technique of uncovering are considered problematic and toxic and are treated internationally with two technical solutions.

a. The solution of covering the fields with fertile top-soil in a depth of 0.8 to 1.20 m which is a very expensive and laborious approach, which, in spite of these difficulties, is the technical solution in application today.

b. The solution of removing the top-soil before uncovering technique of the carbonaceous deposit. Top-soil is collected in rolls and is kept in covered shelters until the field deposits are exhausted; then it is placed on the surface of the resulting field. This solution is technically and ecologically correct; however, it is not followed in practice because it is a solution of high sensitivity and of high cost.

Thus, the restoration of the soils resulting after mining carbon, lignite or peat deposits is difficult. To improve restoration of fertile soils is a problem in reed of solution since those fields do not improve naturally. These coal or lignite fields, apart from the above, face problems because of soil instability and of inability to retain water. They are also charged continuously by urban acid precipitates. In case of operation of lengthy thermoelectrical plants, that charge may result in neutralizing all the alkalinity of the soil to form acidic paths or areas.

It is estimated that 60% at least of the sulfur in the carbonaceous matter after burning to produce electricity will precipitate as a gas or in the form of fly ash on the lignite or coal mining area. They make quantities which on operating fields give the following charges (in tons/y).

TABLE

| lignite field | burned lignite | fly ash | SO2 | NOx |
|---|---|---|---|---|
| Megalopolis, Greece | 15.000.000 | 60.000 | 200.000 | 150.000 |
| Ptolemais, Greece | 45.000.000 | 120.000 | 300.000 | 500.000 |

All the above acid precipitates are burdening the ground of the district and neutralize soil alkalinity in a continuous action. But alkalinity is marginal and the final result will be to form acid areas and paths. It is recognized that the sulfur contained in the soil of lignite fields attains high values and with agricultural activity the biological oxidation of sulfur to sulfuric acid will accelerate with destruction of the soil functioning, shown by, analysis made in Megalopolis, Greece lignite field.

TABLE

Results from the oxidation of soil samples in the lignite field of Megalopolis, Greece (oxidation of the soil samples with 30% $H_2O_2$)

| Number of sample | pH resulted |
|---|---|
| 1 | 1.80 |
| 2 | 6.20 |
| 3 | 7.10 |
| 4 | 4.80 |
| 5 | 4.10 |
| 6 | 1.50 |
| 7 | 4.20 |
| 8 | 2.90 |

The agricultural utilization of coal and lignite fields, which are formed with uncovering, is not, therefore, feasible today because natural fertility is not available. The solution in use today of field with soil depth of 0.80–1.20 m. is of high cost does not offer a good solution, since it is difficult to find much fertile soil to transfer. The operation of thermoelectrical plants on the other hand continues with mining coal or lignite by uncovering the deposits and burning them to produce more and more airborne precipitates.

On the other hand it is imperative to create agricultural employment for the local population with satisfactory income, and this is only possible through greenhouses, which also operate together with the power plants.

Supplementary heating with the warm cooling waters in vast quantities in these areas will be offered, reducing costs. However greenhouses require humus and water retainability. It is known that the operation of greenhouses leads to soil contamination and in 2 to 4 years greenhouses need be transferred to new grounds. These conditions, however, cannot prevail in greenhouses operating in coal and lignite fields since they need to be constructed with high technical quality and transfer is very costly.

SUMMARY OF INVENTION

The present solution to improve those toxic fields and to introduce greenhouse operation is highly original and very profitable. It is a solution satisfying the above requirements that leads to programmed production, to stable and high water retainability. It operates so that nutrition is available according to existing needs biologically controlled, with complete utilization regulated to be slowly consumed so that there is no soil deterioration and materials are not rejected in the environment.

The inventive solution includes:

a) The utilization of processed polymeric products which in soil retain water in high amounts (200–300 times their weight). The retained water is quantitatively disposed to serve nutritional needs of the plants since it is molecularly enclosed and does not evaporate nor infiltrate into the ground. In that way water is offered continuously; water economy is improved up to 10 times. In addition these products advance feeding by ion exchange and absorption-desorption of unlimited capacity; thus they act as fertility promoters which by programming can lead to high quality and quantity in food products.

b) The utilization of fertilizers, soil pesticides, and trace metals etc. coated in a non-water-soluble form and bioregradable in soil.

BRIEF DESCRIPTION OF THE DRAWING

The drawing figure is a graph plotting biomass production as a function of the swelling ratio of polymeric products.

DETAILED DESCRIPTION

Products of the above type a) and b) are in the market today, such as the polyacrylamides used as water superabsorbents and coated feeding element fertilizers, but these are not meeting the above requirements in operating greenhouses in toxic coal and lignite fields.

The above solutions have been realized by the inventor through products that the inventor has developed, viz. the coated fertilizers of trade name Bioval-BRF described in U.S. Pat. No. 5,137,563 and the processed polymers of trade name Hydroval-X described in the relevant Greek patent.

The processed polymer products derived mostly from recycled polymers retain water up to 250 times their weight and are available for plant growth in repeated action to last in soil for many years (up to 30 years). The coated fertilizers etc, are consumed in soil according to the existing biological activity which is advanced by the action of Hydroval-X.

With that pair of technological products continuous nutrition and plant growth in soil is advanced with continuous water offer, water economy and the ability to consume all the nutrients in Bioval-BRF. Therefore no material charges will be created on soil, so as to need replacement. Thus, with this original and highly profitable solution, conditions are formed by which the greenhouse can operate without transposition after 2 to 4 years, which in fact makes a special condition in those fields, where the electricity producing plants still operate and airborne acidic precipitates are produced.

However the soil of coal or lignite fields, where the proposed greenhouses are to operate is unstable and contains sulfur. Thus, by introducing plants to grow and biomass production, it will be oxidixed to sulfuric acid. Also, in the intensive operation the greenhouses introduce, those events will be accelerated. The invention solves this problem as follows: the soil in the greenhouse is mixed with pulverized calcium carbonate in quantity and in depth to create safety in operation without risk for destroying greenhouse production by acidic contaminates.

EXAMPLE 1

The soil where the greenhouses are to be erected is excavated in depth of 1.5 m, width of 25 m, length of 60 m. The soil of excavation is mixed with 1% to 2% calcium carbonate in pulverized form and the hole formed is filled with soil mixed with calcium carbonate leaving an upper layer of 30 cm. The rest of the excavated soil having calcium carbonate is thoroughly mixed with Hydroval-X I o/oo w/w and with Bioval-BRF 5 o/oo w/w and used to fill up the upper empty part of 30 cm depth. On the conditioned ground a greenhouse of sophisticated design is then erected requiring heat supplied by thermoelectrical plants in the form of warm cooling water of steam turbines.

EXAMPLE 2

Lignite soil of Megalopolis. Greece, which after H202 oxidation has shown an acidity of pH 6.5 is treated according to Example 1 and in a greenhouse erected on the soil with heating network supplied by the cooling water supplied by thermoelectrical plants operating at stable temperature of 30° C. and saturated humidity. The greenhouse soil is planned and parallel to it a frame containing untreated lignite soil is placed and in both were planted tomato infant plants with irrigation applied every 3 days.

| GreenHouse Soil | Frame Soil |
| --- | --- |
| 6 days 15 cm growth | 3,8 cm |
| 12 days 20,3 cm growth | 7,1 cm |
| 20 days 31 cm growth | 10.2 cm |
| 40 days 39 cm growth | 12.2 cm | tomato plants rich in flowers no flowering occurred dry biomass weight 122 gr/plant 32 gr/plant i.e. four times speed and development.

EXAMPLE 3

In lignite soil of Ptolemais, Greece, which by oxidation (H202) gave pH 5.8 growth of tomato was organized as in Example 2.

The following results were obtained

| GreenHouse Soil | Frame Soil |
| --- | --- |
| 6 days growth 15 cm | 4 cm |
| 12 days growth 22 cm | 6 cm |
| 20 days growth 34 cm | all plants were destroyed |
| 40 days growth 43 cm | |
| tomato plants rich in flowers | |
| dry biomass produced 129 g/plant | |

EXAMPLE 4

On Ptolemais lignite soil, which after oxidation (H202) gave pH 6.8 lettuce plants are placed in greenhouse soil and in frame. The greenhouse operates at 30° and is irrigated every 2 days

| GreenHouse Soil | Frame Soil |
| --- | --- |
| 6 days 16 cm growth | 6 cm |
| 12 days 21 cm growth | 11,2 cm |
| 20 days 35 cm growth | 16 cm |
| 40 days 46 cm growth | 20,1 cm |
| dry biomass production | |
| 32 gr/plant | 10,5 gr/plant |

EXAMPLE 5

In the greenhouse soil of example 4 the conditions for water economy were studied. After 12 days of growth the plants were left without irrigation. Wilting occurred in 42 days of growth. In between growth was regular without differences occurring. There was thus observed a possibility for water economy up to 7 times not affecting growth.

the drawing figure shows an increase in biomass production as the swelling ratio of four polymeric increases. The polymeric products comprise $CaCo_3$, Bioval-BRF and Hydroval, with the last being present in each of the respective products in different percentage.

What is claimed is:

1. A method for cultivating a field from which coal or lignite has been mined such that the field contains mined soil having a greater sulfur content, a reduced ability to retain water and a reduced fertility for cultivation of plants as compared to an initial soil present in the field prior to the coal or lignite having been mined, said method comprising:

a) treating the mined soil by mixing the mined soil with absorbent polymers that enhance the ability of the mined soil to retain water and by supplying the mined soil with nutrients which improve the fertility of the mined soil for cultivation of the plants; said polymers being selected such that, when they are mixed into the soil in sufficient amounts, the polymers a) molecularly enclose water and substantially preclude the water from evaporation or infiltration into the ground; b) retain water in amounts of between about 200–300 times their weight; and c) promote the incorporation of the nutrients into the soil by ion exchange and sorption-desorption of the nutrients and b) cultivating the plants in the treated soil.

2. A method as claimed in claim 1, wherein the plants are cultivated in step b) in a greenhouse in the field.

3. A method as claimed in claim 2, wherein the greenhouse is maintained at a temperature conducive for the cultivation of the plants at least in part by cooling warm water from a thermoelectric plant.

4. A method as claimed in claim 3, wherein the sulfur in the mined soil is susceptible to being oxidized to sulfuric acid in amounts that are toxic to the plants, said method further comprising introducing pulverized calcium carbonate into the mined soil in an amount sufficient to prevent formation of the sulfuric acid in amounts that are toxic to the plants.

5. A method as claimed in claim 4, wherein the sulfur content in the mined soil is between about 0.5–3% by weight prior to introduction of the pulverized calcium carbonate, said calcium carbonate being introduced into the mined soil in an amount of about 1–2% w/w.

6. A method as claimed in claim 5, wherein the polymers retain water in amounts of about 200–300 times more than a weight of the polymers.

7. A method as claimed in claim 6, wherein the nutrients comprise fertilizers which have a water insoluble coat, which are biodegradable and which are released gradually into the treated soil.

8. A method according to claim 3 in which the polymers promote water economy and biologically controlled feeding of the plants, said polymers advancing water economy of the treated soil up to 10 times with unlimited feeding efficiency and with ion exchange and absorption-desorption of the nutrients.

9. A method according to claim 3 wherein the treating step a) improves fertility efficiency in the field sufficiently such that the treated soil acts as a support and is not deteriorated or polluted, whereby the treated soil is suitable for cultivating the plants in the greenhouse for an extended period.

10. A method for cultivating a field from which coal or lignite has been mined such that the field contains mined soil having a greater sulfur content, a reduced ability to retain water and a reduced fertility for cultivation of plants as compared to an initial soil present in the field prior to the coal or lignite having been mined, said method comprising treating the mined soil by mixing the mined soil with absorbent polymers that enhance the ability of the mined soil to retain water and by supplying the mined soil with nutrients which improve the fertility of the mined soil for cultivation of the plants; said polymers being selected such that, when they are mixed into the soil in sufficient amounts, the polymers a) molecularly enclose water and substantially preclude the water from evaporation or infiltration into the ground; b) retain water in amounts of between about 200–300 times their weight; and c) promote the incorporation of the nutrients into the soil by ion exchange and sorption-desorption of the nutrients.

11. A method as claimed in claim 10, wherein the sulfur in the mined soil is susceptible to being oxidized to sulfuric acid in amounts that are toxic to the plants, said method further comprising introducing pulverized calcium carbonate into the mined soil in an amount sufficient to prevent formation of the sulfuric acid in amounts that are toxic to the plants.

12. A method as claimed in claim 11, wherein the sulfur content in the mined soil is between about 0.5–3% by weight prior to introduction of the pulverized calcium carbonate, said calcium carbonate being introduced into the mined soil in an amount of about 1–2% w/w.

13. A method as claimed in claim 12, wherein the polymers retain water in amounts of about 200–300 times more than a weight of the polymers.

14. A method as claimed in claim 13, wherein the nutrients comprise fertilizers which have a water insoluble coat, which are biodegradable and which are released gradually into the treated soil.

* * * * *